United States Patent [19]

Yoshida et al.

[11] Patent Number: 4,672,811
[45] Date of Patent: Jun. 16, 1987

[54] VEHICLE SPEED CONTROL SYSTEM

[75] Inventors: Daisuke Yoshida; Tomiya Tanno, both of Hiratsuka; Takeshi Fukunaga, Isehara, all of Japan

[73] Assignee: Kabushiki Kaisha Komatsu Seisakubsho, Tokyo, Japan

[21] Appl. No.: 601,228

[22] Filed: Apr. 17, 1984

[51] Int. Cl.⁴ .................... B60K 41/20; B60K 41/16
[52] U.S. Cl. .................................... 60/449; 60/445
[58] Field of Search ............... 60/487, 490, 449, 445

[56] References Cited

U.S. PATENT DOCUMENTS

| | | | |
|---|---|---|---|
| 3,529,422 | 9/1970 | Herndon, Jr. | 60/395 |
| 4,082,013 | 4/1978 | Dornfeld et al. | 60/911 |
| 4,103,489 | 8/1978 | Fletcher et al. | 60/449 |
| 4,310,078 | 1/1982 | Shore | 180/6.48 |
| 4,448,021 | 5/1984 | Hawkins | 60/449 |

FOREIGN PATENT DOCUMENTS 84644  7/1977  Japan .

*Primary Examiner*—Gerald A. Michalsky
*Attorney, Agent, or Firm*—Spensley Horn Jubas & Lubitz

[57] ABSTRACT

In a vehicle speed control system, a vehicle speed command set corresponding to the position of a vehicle speed setting lever is fed into a dead area setting circuit in which the value of the vehicle speed command is changed to be not smaller than a preset minimum speed of the vehicle when it falls out of the dead area. Then the command is supplied into different delay compensating circuit depending on whether it is an acceleration command or a deceleration command. Further, the command outputted from the delay compensating circuit is subtracted by a brake signal generated by the operation of a brake pedal. The command thus subtracted causes a mechanical brake signal to generate when the speed of the vehicle is zero or minus.

7 Claims, 3 Drawing Figures

VEHICLE SPEED CONTROL SYSTEM

BACKGROUND OF THE INVENTION

1. Field of the Invention

The present invention relates to a vehicle speed control system for controlling vehicle speeds by controlling either or both of the displacement of the hydraulic pump and hydraulic motor in the hydraulic transmission.

2. Description of the Prior Art

A conventional hydraulic transmission typically has a variable capacity hydraulic pump (e.g. swash plate type pump) to be driven by an engine on the engine side and a variable capacity hydraulic motor (swash plate type motor) on the driving shaft side for driving vehicle wheels or a crawler belt, and transmits the driving force of the engine to the wheels or the crawler belt by directing the operating fluid discharged from the pump through the hydraulic piping. Speed control of the vehicle is performed by adjusting the discharge amount of the hydraulic pump and the suction amount of the hydraulic motor per rotation of the engine by means of controlling the slope angle of both the swash plates of the hydraulic pump and the hydraulic motor, thereby changing the speed of the driving shaft for each rotation of the engine.

Since the conventional vehicle speed control system is designed to perform vehicle speed control by mechanically controlling the slope angle of the swash plate by the movement caused by the operation of a vehicle speed setting lever, a brake lever and a throttle lever by the vehicle operator, the structure of the control system becomes unavoidably complex. Accordingly, in the conventional system performing vehicle speed control is difficult and therefore driving comfort, safety and other factors are likely to be neglected.

SUMMARY OF THE INVENTION

Accordingly, the present invention has been made to solve the problems involved in the prior art, and an object of the present invention is to provide a vehicle speed control system which assures comfortable driving, smooth vehicle speed control, and outstandingly safe vehicle speed control.

Another object of the present invention is to provide a vehicle speed control system wherein optimum delay characteristic is imparted to a vehicle speed command in accordance with whether the vehicle speed command is an acceleration command or a deceleration command, whereby a proper acceleration feeling can be felt during an acceleration period, while a shock caused by deceleration can be avoided during a deceleration period.

A further object of the present invention is to provide a vehicle speed control system wherein the speed control at the time from forward to backward travel or vice versa is performed smoothly as a result of provision of a switch before the feedback system which is transferred according to whether or not the vehicle speed command is in a dead area.

A still further object of the present invention is to provide a vehicle speed control system wherein whether the vehicle is running or in the stop state can be easily judged, hence promoting the travel safety, since the step-up quantity can be suitably adjusted when the vehicle speed command is out of the dead area.

A still further object of the present invention is to provide a vehicle speed control system wherein a desired braking is effected by suitably using the engine brake and mechanical brake according to the reduction of the vehicle speed command, or using both.

According to the present invention, a vehicle speed command set corresponding to the position of a vehicle speed setting lever is fed into a dead area setting circuit in which the value of the vehicle speed command is changed to be not smaller than a preset minimum speed of the vehicle when it falls out of the dead area. Then the command is supplied into different delay compensating circuits depending on whether it is an acceleration command or a deceleration command. Further, the command outputted from the delay compensating circuit is subtracted by a brake signal generated by the operation of a brake pedal. The command thus subtracted causes a mechanical brake signal to generate when the speed of the vehicle is zero or minus.

The present invention will be described in detail with reference to the attached drawings.

DETAILED DESCRIPTION OF THE PREFERRED EMBODIMENT

Figure 1:
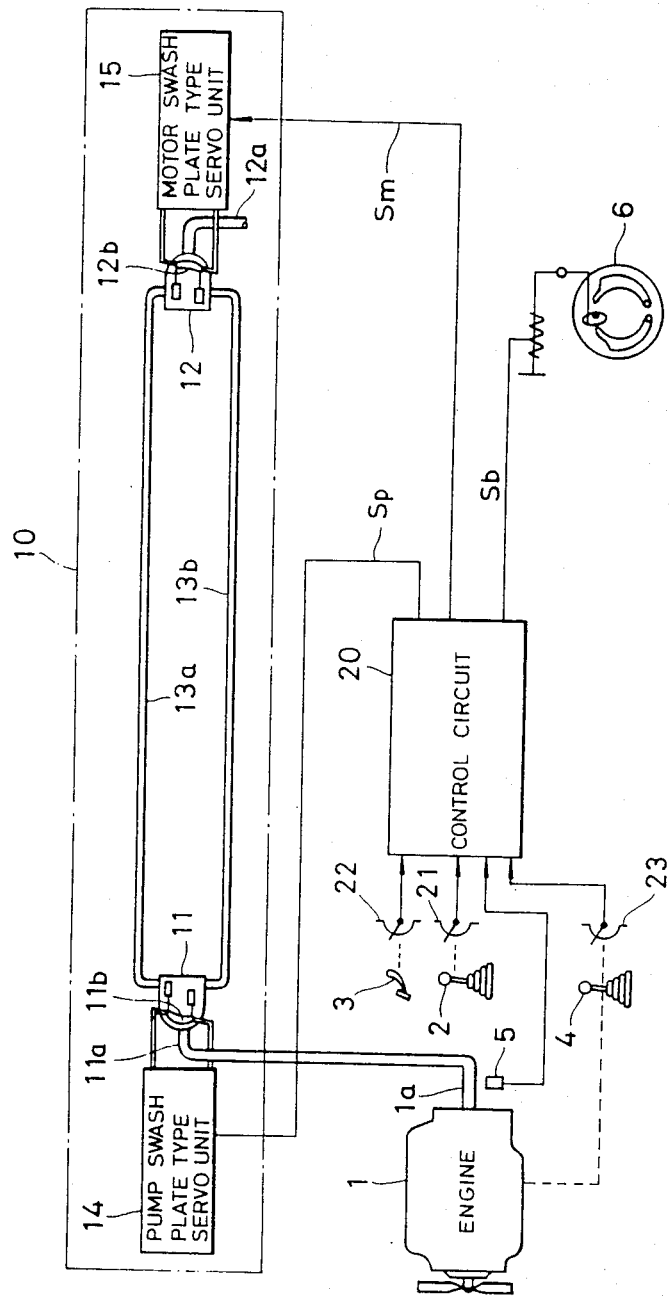
FIG. 1 is a schematic drawing showing an embodiment of the drive system to which the vehicle speed control system of the present invention applies.

Referring to FIG. 1, a hydraulic transmission 10 comprises a variable capacity hydraulic pump (hereinafter referred to simply as a hydraulic pump 11 and a variable capacity hydraulic motor (hereinafter referred to simply as a hydraulic motor) 12. The hydraulic pump 11 and the hydraulic motor 12 are connected to each other through hydraulic pipes 13a and 13b. A shaft 11a of the hydraulic pump 11 is coupled with the output shaft 1a of an engine 1, and is driven by the engine 1. A shaft 12a of the hydraulic motor 12 is coupled with driving wheels of a vehicle not shown to drive the wheels.

The variable capacity hydraulic pump is suitable for the use in the fixed output shaft torque, while the variable capacity hydraulic motor is suitable for the use in the fixed output. In this embodiment, both the hydraulic pump 11 and the hydraulic motor 12 are of the variable capacity type to exploit features of the both. In addition, the hydraulic pump 11 and the hydraulic motor 12 are a variable capacity type pump and variable capacity type motor that can change the displacement by changing the slope angles of swash plates 11b and 12b.

A pump swash plate servo unit 14 is for controlling the direction and amount of the discharge of hydraulic fluid of the hydraulic pump 11, and controls the direction and angle of the slope of the swash plate 11b according to the polarity and magnitude of a pump capacity change signal Sp from a control unit 20. The hydraulic pump 11 discharges the hydraulic fluid in the direction and at a flowrate corresponding to the slope direction and slope angle of the swash plate 11b. A motor swash plate servo unit 15 is for controlling the suction amount of hydraulic fluid of the hydraulic motor 12, and is designed to control the slope angle of the swash plate 12b of the hydraulic motor 12 based on a motor capacity change signal Sm from the control unit 20. The rotational direction and the torque of the hydraulic motor 12 change according to the direction and amount (suction amount) of entering hydraulic fluid. Accordingly, by controlling the discharge amount from the hydraulic pump 11 and the suction amount into the hydraulic motor 12, speed change control by the transmission 10 can be accomplished.

The control circuit 20 generates a pump capacity change signal Sp and a motor capacity change signal Sm for controlling the capacities of hydraulic pump 11 and hydraulic motor 12 as well as a mechanical brake signal Sb for controlling a mechanical brake 6 based on a signal corresponding to the position of a vehicle speed setting lever 2 for setting the vehicle speed which is generated by a potentiometer 21, a signal corresponding to the position of a brake pedal 3 which is generated by a potentiometer 22, a signal corresponding to the position of a throttle lever 4, and a pulse signal corresponding to the speed (rpm) of the engine 1 which is generated by an engine speed sensor 5.

Figure 2:
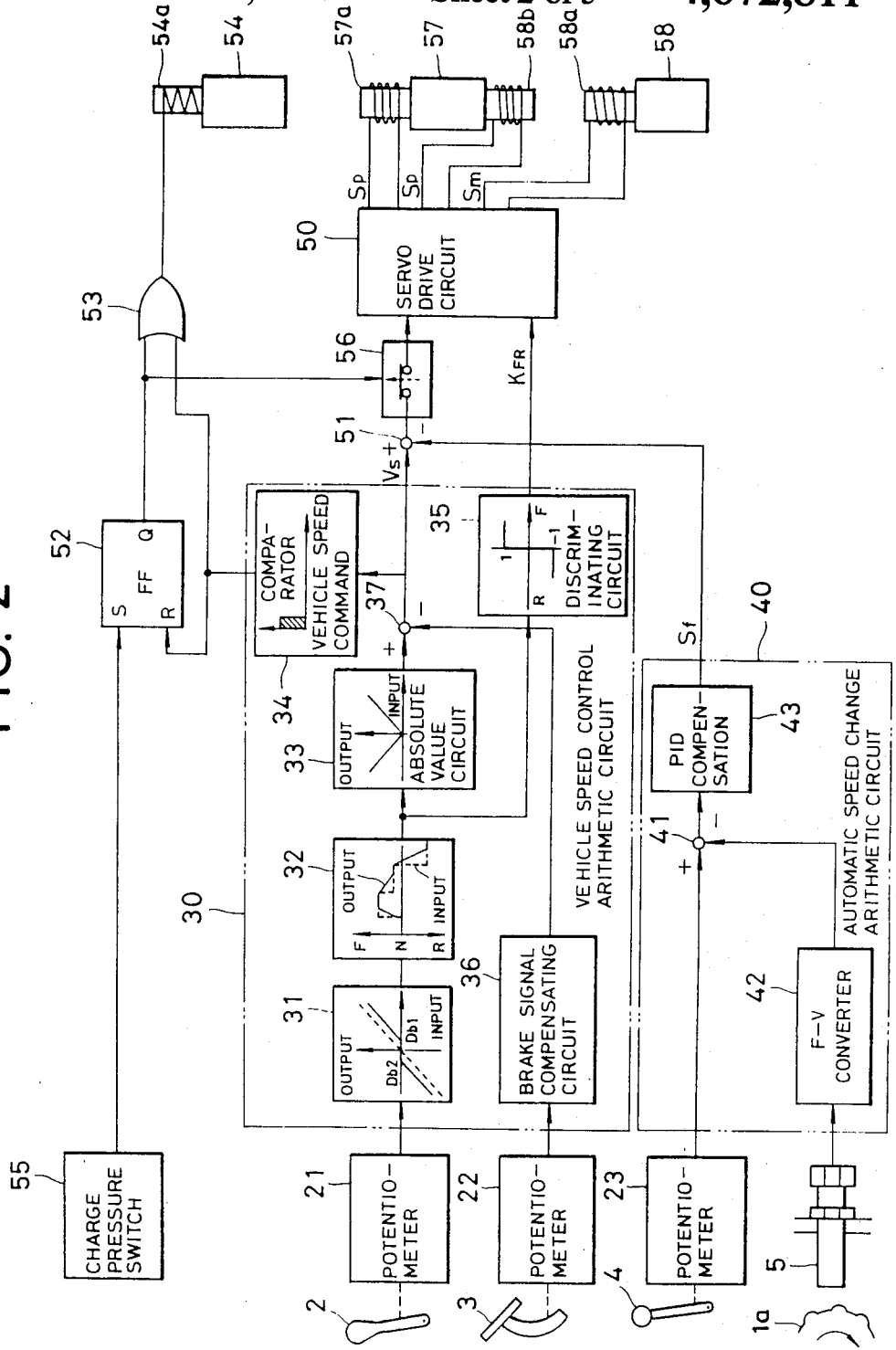
FIG. 2 is a block diagram showing an embodiment of the control circuit of the present invention.

The control circuit 20 will now be described with reference to the block diagram of FIG. 2. The control circuit 20 includes a vehicle speed control arithmetic circuit 30 to which signals from the potentiometers 21 and 22 are fed, an automatic speed change arithmetic circuit 40 to which signals are fed from the potentiometer 23 and the engine speed sensor 5, a servo drive circuit 50, and other elements.

The vehicle speed control arithmetic circuit 30 (the detail will be given later) comprises a dead area setting circuit 31, a compensating circuit 32, an absolute value circuit 33, a comparator 34, a discriminating circuit 35, a brake signal compensating circuit 36, and other elements. The dead area setting circuit 31 sets the dead area of a signal to be fed from the potentiometer 21, and also sets a step-up value so as to rise or fall by a specified value when the input signal falls out of the set dead area. The compensating circuit 32 outputs a signal in response to a signal supplied from the dead area setting circuit 31 with a suitable time delay, applying it to the absolute value circuit 33 and the discriminating circuit 35. The discriminating circuit 35 detects the polarity (positive or negative) of the input signal, and outputs a direction signal KFR which becomes "1" when the signal is positive, and "−1" when the signal is negative. The absolute value circuit 33 takes the absolute value of the input signal, and applies it to a subtracting point 37.

On the other hand, the brake signal compensating circuit 36 outputs a suitable brake signal according to the signal fed from the potentiometer 22, outputs the signal fed from the potentiometer 22 with a time delay, and outputs the signal as a brake signal Sb instantly when the input signal has exceeded a preset level. The brake signal Sb is applied to the subtracting point 37. At the subtracting point 37, the brake signal is subtracted from the signal fed from the absolute value circuit 33, and outputs the resultant signal to the comparator 34 and a subtracting point 51 as a vehicle speed command signal Vs.

When the vehicle speed command signal Vs becomes a value lower than vehicle speed "0", the comparator 34 outputs a signal "1" to the reset terminal R of a flip-flop 52 and to a coil 54a of a brake solenoid valve 54, thereby resetting the flip-flop 52, and actuating the mechanical brake 6 (see FIG. 1). A charge pressure switch 55 is for detecting that the charge pressure of the hydraulic transmission dropped below a specified pressure, and outputs a signal "1" to the set terminal S of the flip-flop upon the detection thereof. When set by the output of the switch 55, the flip-flop 52 outputs a signal "1" to the coil 54a of the brake solenoid valve 54 via an OR circuit 53 and also to a switch 56. As the signal "1" is fed, the switch 56 opens its contact so as to keep a vehicle speed command from being output to the servo drive circuit 50.

To the other input of the subtracting point 51, a speed change signal Sf has already been fed from the automatic speed change arithmetic circuit 40. The automatic speed change arithmetic circuit 40 calculates the difference between the engine speed set by the throttle lever 4 and the current engine speed, and outputs a speed change signal Sf to keep the engine speed from falling below the present current speed by a predetermined engine speed due to load variation. That is, ready-to-operate condition near the maximum horse-power point is created. The automatic speed change arithmetic circuit 40 comprises a subtracting point 41, a frequency-voltage converter 42, and a PID compensating circuit 43. To one input of the subtracting point 41 is fed a signal corresponding to the position of the throttle lever 4 from the potentiometer 23. The frequency-voltage converter 42 converts input pulse signals to a voltage signal corresponding responding to the number of pulses, feeding it to the other input of the subtracting point 41. The subtracting point 41 calculates the difference between the output signal of the potentiometer 23 and the output signal of the frequency-voltage converter 42, and outputs the resultant difference as a speed change signal Sf through the PID compensating element 43. The PID compensating element 43 is provided to prevent engine rotation and vehicle speed from becoming unstable during automatic speed change.

The subtracting point 51 subtracts the speed change signal Sf from the vehicle speed command signal Vs, and applies the result of subtraction to the servo drive circuit 50 via the switch 56. The servo drive circuit 50 is for controlling the direction and amount of discharge of the hydraulic pump of the transmission 10 and the suction amount of the hydraulic motor 12, and outputs the pump capacity change signal Sp and the motor capacity change signal Sm in the proportion preset according to the signal to be fed from the subtracting point 51. In addition, the servo drive circuit 50 determines the polarity of the pump capacity change signal Sp according to the polarity of the direction signal KFR. The pump capacity change signal Sp is fed to a coils 57a and 57b of a solenoid valve 57 which is for actuating the pump swash plate servo unit 14, while the motor capacity change signal Sm is fed to a coil 58a of a solenoid valve 58 which is for actuating the motor swash plate servo unit 15.

Accordingly, the pump swash plate servo unit 14 and the motor swash plate servo unit 15 control the slope angle of the swash plate based on the signals Sp and Sm, control the discharge amount of the hydraulic pump 11 and the suction amount of the hydraulic motor 12, and control the speed change of the transmission 10.

Now, the vehicle speed control arithmetic circuit 30 will be described in detail.

Figure 3:
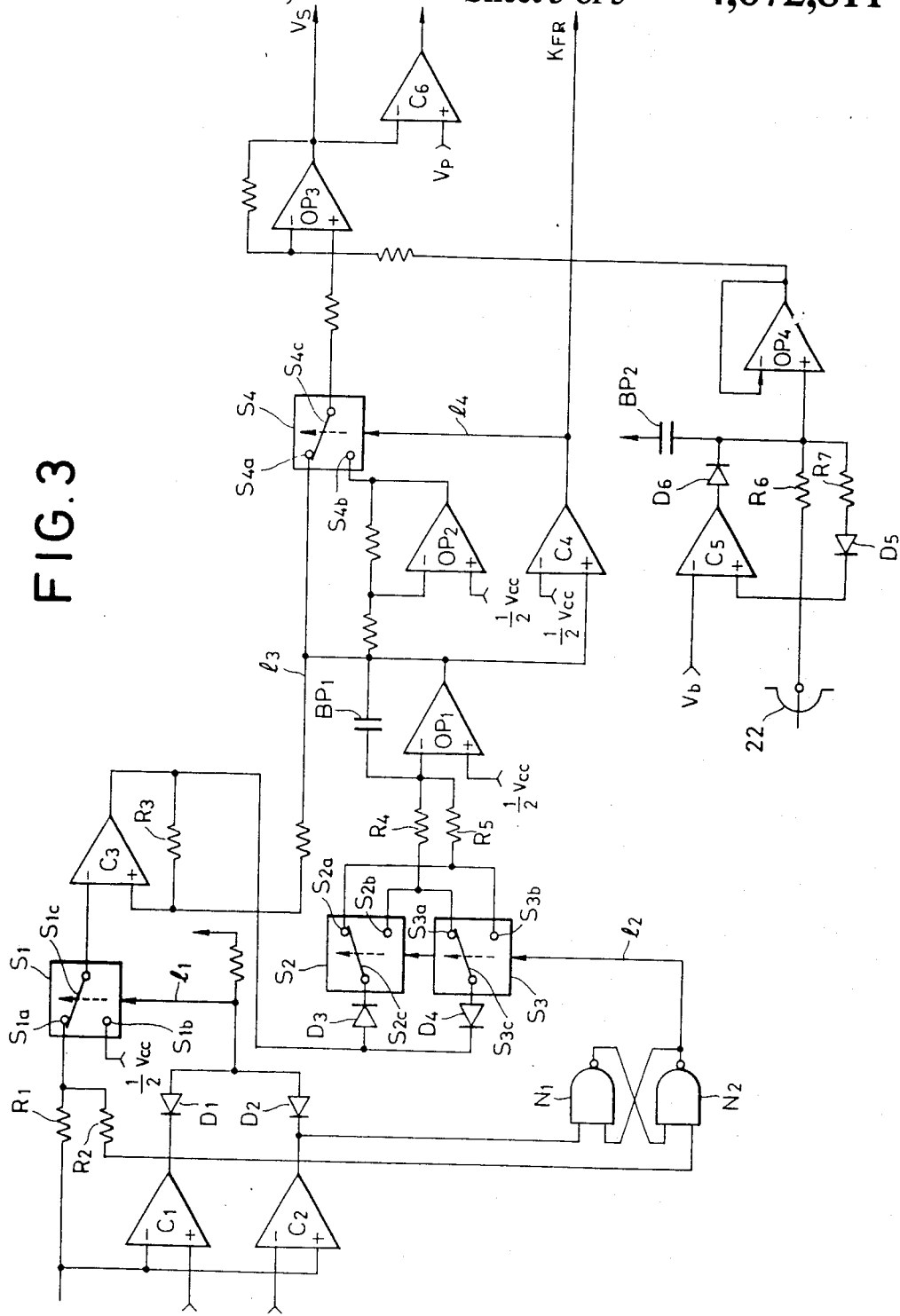
FIG. 3 is a circuit diagram of an embodiment of the vehicle speed control arithmetic circuit of the present invention.

FIG. 3 shows a circuit diagram of an embodiment of the vehicle speed control arithmetic circuit 30. The potentiometer 21 outputs from voltage 0 to Vcc according to the position of the vehicle speed setting lever 2. Voltage 0 corresponds to the maximum backward speed set value, voltage Vcc to the maximum forward speed set value, and voltage $\frac{1}{2}$Vcc to vehicle speed 0.

These voltage signals are fed to the negative input of a comparator $C_1$ and the positive input of a comparator $C_2$ respectively, and also fed to a contact $S_{1a}$ of a switch $S_1$ via a resistor $R_1$. To the positive input of the comparator $C_1$ and the negative input of the comparator $C_2$, dead area setting voltages $D_{b1}$ and $D_{b2}$ for setting the dead area are fed. The setting voltage $D_{b1}$ is higher than the voltage $\frac{1}{2}$Vcc, and the setting voltage $D_{b2}$ is lower than the voltage $\frac{1}{2}$Vcc.

Accordingly, when the output voltage signal of the potentiometer 21 is within the range from the setting voltage $D_{b1}$ to $D_{b2}$, both the comparators $C_1$ and $C_2$ become high level. As a result, no current flows to diodes $D_1$ and $D_2$, and a movable contact piece $S_{1c}$ of the switch $S_1$ contacts the contact $S_{1a}$.

When a voltage signal higher than the setting voltage $D_{b1}$ is output from the potentiometer 21, the output of the comparator $C_1$ falls to the low level, and the movable contact piece $S_{1c}$ of the switch $S_1$ contacts the contact $S_{1a}$. At this time, the above voltage signal is fed to the contact $S_{1a}$ divided by resistors $R_1$ and $R_2$. In the same manner, when a voltage signal lower than the setting voltage $D_{b2}$ is output from the potentiometer 21, the output of the comparator $C_2$ falls to the low level, and the movable contact piece $S_{1c}$ of the switch $S_1$ engages the contact $S_{1a}$. At this time, the difference (voltage) between the above voltage signal and the high level output voltage of the comparator $C_1$ is applied to the contact $S_{1a}$ divided by the resistors $R_1$ and $R_2$. That is, when the output voltage signal of the potentiometer 21 falls out of the dead area, the movable contact piece of the switch $S_1$ is transferred to the contact $S_{1a}$, while to the contact $S_{1a}$, a voltage of a given step-up value divided according to the resistance ratio of resistors $R_1$ and $R_2$ is applied. The above step-up value can be suitably set according to the resistance ratio of the resistors $R_1$ and $R_2$. It is preferable that the step-up value is set so as to correspond to the minimum vehicle speed, that is, the minimum speed at which one can sense the speed.

By this means, whether the vehicle is running or in the stop state can be judged easily, and the dead area of high safety can be set. The circuit consisting of the above comparators $C_1$ and $C_2$, resistors $R_1$ and $R_2$, diodes $D_1$ and $D_2$, and the switch $S_1$ corresponds to the dead area setting circuit 31 (FIG. 2) of the vehicle speed control arithmetic circuit 30.

On the other hand, outputs of the comparators $C_1$ and $C_2$ are fed to NAND circuits $N_1$ and $N_2$ which form flip-flop, respectively. As a result, when the output of the comparator $C_1$ falls to the low level, the NAND circuit $N_2$ outputs a high level signal to a line $l_2$. When the output of the comparator $C_2$ falls to the low level, the NAND circuit $N_2$ outputs a low level signal to the line $l_2$. The line $l_2$ is connected to switches $S_2$ and $S_3$. When the line $l_2$ becomes high level, movable contact pieces $S_{2c}$ and $S_{3c}$ of the switches $S_2$ and $S_3$ engage contact $S_{2a}$ and $S_{3a}$, respectively. When the line $l_2$ becomes low level, movable contact pieces $S_{2c}$ and $S_{3c}$ of the switches $S_2$ and $S_3$ engage contacts $S_{2b}$ and $S_{3b}$ respectively.

A comparator $C_3$ wherein the output of the switch $S_1$ is fed to its negative input and a signal corresponding to the present speed, i.e., a signal appearing in a line $l_3$, is fed to the positive input is a comparator positive-feedbacked by a resistor $R_3$, and outputs a deviation signal to diodes $D_3$ and $D_4$ so as to bring the signal in the line $l_3$ to coincide with the input voltage at a fixed width.

Accordingly, when the output voltage signal of the potentiometer 21 is in the forward and acceleration direction, the output of the comparator $C_3$ is fed to the negative input of an operational amplifier $OP_1$ through the diode $D_4$, switch $S_3$, and a resistor $R_4$. When the above voltage signal is in the forward and deceleration direction, the output of the comparator $C_3$ is fed to the negative input of the operational amplifier $OP_1$ through the diode $D_3$, switch $S_2$, and a resistor $R_5$. When the output voltage signal of the potentiometer 21 corresponds to the backward direction, the switches $S_2$ and $S_3$ are transferred by a low level signal appearing in the line $l_2$, the output of the comparator $C_3$ is fed to the negative input of the operational amplifier $OP_1$ through the diode $D_3$, switch $S_2$, and resistor $R_4$ when the above voltage signal is acceleration, and to the negative input of the operational amplifier $OP_1$ through the diode $D_4$ switch $S_3$, and resistor $R_5$ when the voltage signal is deceleration.

The operational amplifier $OP_1$ is a delay compensating integrator having the resistors $R_4$ and $R_5$, and a capacitor $BP_1$, and determines a delay time of the signal in the line 13 in the charge direction (acceleration direction) and the discharge direction (deceleration direction) based on the resistance values of the resistors $R_4$ and $R_5$.

Accordingly, by suitably setting the resistance values of the resistors $R_4$ and $R_5$ an optimum delay time setting becomes possible so that proper acceleration feeling can be obtained at the acceleration time, and that deceleration shock does not occur at the deceleration time.

In either of the cases when the lever position of the speed setting lever 2 is transferred from forward to backward and when from backward to forward, a delay time in the acceleration direction is set. In this case, the signal in the line $l_3$ smoothly responds to from the signal corresponding to forward to the signal corresponding to backward or vice versa. This is due to the provision of the switch $S_1$ for setting the dead area before the comparator $C_3$. The circuit consisting of the comparator $C_3$, diodes $D_3$ and $D_4$, switches $S_2$ and $S_3$, resistors $R_4$ and $R_5$, capacitor $BP_1$, and operational amplifier $OP_1$ corresponds to the compensating circuit 32 (FIG. 2) of the vehicle speed control circuit 30.

The output voltage of an operational amplifier $OP_2$ is applied to the contact $S_{4a}$ of the switch 4, the negative input of the operational amplifier $OP_2$, and the positive input of the comparator $C_4$. The operational amplifier $OP_2$ is an inverting amplifier, inverts the input voltage by the voltage $\frac{1}{2}$Vcc, and applies the voltage thus inverted to the contact $S_{4b}$ of the switch $S_4$. The comparator $C_4$ is for identifying whether the input voltage is the forward area or the backward area. In the case of forward area, the comparator $C_4$ outputs a high level direction signal KFR, and brings the movable contact piece $S_{4c}$ of the switch $S_4$ to engage the contact $S_{4a}$ via a line $l_4$. In the case of backward area, the comparator $C_4$ outputs a low level direction signal KFR, and brings the movable contact piece $S_{4c}$ of the switch $S_4$ to engage with the contact $S_{4b}$ via the line $l_4$.

The circuit comprising the switch $S_4$, operational amplifier $OP_2$, and comparator $C_4$ corresponds to the absolute value circuit 33 and the discriminating circuit 35 (FIG. 2) of the vehicle speed control circuit 30, and the direction signal KFR is fed to the servo drive circuit 50.

The output voltage of the switch $S_4$ is applied to the positive input of an operational amplifier $OP_3$. The operational amplifier $OP_3$ is a subtractor, and a brake signal associated with the depression (treading) of the brake pedal 3 is fed to the negative input.

The brake signal will now be described. The potentiometer 22 generates a voltage signal corresponding to the depression quantity (or depth) of the brake pedal 3, and applies to the positive input of a comparator $C_5$, resistor $R_6$, and diode $D_5$. The comparator $C_5$ is designed to operate at the time of abrupt stop. When a voltage signal larger than the preset voltage Vb is generated at the potentiometer 22, the comparator $C_5$ instantly charges a capacitor $BP_2$ via a diode $D_6$, and applies the input voltage to the positive input of the operational amplifier $OP_4$. It is necessary to set the preset voltage Vb to a voltage sufficient for applying mechanical brake (mentioned later).

On the other hand, when a voltage signal smaller than the preset voltage Vb is generated at the potentiometer when the brake pedal 3 is depressed, the voltage signal is charged at the capacitor $BP_2$ via the resistor $R_6$, and the charging voltage is fed to the positive input of the operational amplifier $OP_4$.

When the brake pedal 3 is released, the electric charge given to the capacitor $BP_2$ is discharged by two systems of the resistor $R_6$, and a resistor $R_7$ and the diode $D_5$. That is, it is so designed that the delay time of the voltage signal (brake signal) appearing at the positive input of the operational amplifier $OP_4$ at the time of the depression of the brake pedal 3 differs from that at the time of release.

The operational amplifier $OP_4$ is a voltage follower circuit, and feeds the above brake signal fed to the positive input directly to the negative input of the operational amplifier $OP_3$. The circuit comprising the comparator $C_5$, diodes $D_5$ and $D_6$, resistors $R_6$ and $R_7$, capacitor $BP_2$, and operational amplifier $OP_4$ corresponds to the brake signal compensating circuit 36 (FIG. 2) of the vehicle speed arithmetic circuit 30.

The operational amplifier $OP^3$ subtracts the brake signal from the voltage signal fed from the switch $S_4$, and outputs the resultant signal as a vehicle speed command signal Vs.

Part of the vehicle speed command signal Vs is directed to the negative input of a comparator $C_6$. The comparator $C_6$ is for actuating the mechanical brake 6. When the vehicle speed command signal has become smaller than the preset voltage $V_p$, a high level voltage signal is output, thereby actuating the mechanical brake 6. The preset voltage Vp is to be a voltage slightly higher than the voltage signal ($\frac{1}{2}$Vcc) corresponding to the vehicle speed 0.

Consequently, when a voltage signal corresponding to the vehicle speed 0 is output from the switch $S_4$ without the depression of the brake pedal 3, the vehicle speed command signal Vs becomes voltage $\frac{1}{2}$Vcc, and the mechanical brake 6 is actuated by the output of the comparator $C_6$. That is, at the parking time, the mechanical brake 6 is actuated automatically. Of course, when the vehicle speed command signal Vs falls below voltage $\frac{1}{2}$Vcc as a result of the depression of the brake pedal 3, the mechanical brake 6 is actuated. Furthermore, when a brake signal higher than the setting voltage Vb has been output from the potentiometer 22 as a result of the depression of the brake pedal 3, the mechanical brake 6 is actuated regardless of the voltage signal to be output from the switch S4.

In this embodiment, the vehicle speed control is designed to be accomplished by means of the signal generated as a result of the detection of the position of the vehicle speed setting lever, the position of the brake pedal, or the like, However, alterations and modifications may be made. For example, the above signal may be given by the operation of a radio control device. In addition, though this embodiment has been described in connection with the case when a single system of the transmission is used, similar construction may be made when two systems of the transmission are used.

What is claimed is:

1. A vehicle speed control system for performing vehicle speed control by controlling the displacement of at least one of a hydraulic pump and a hydraulic motor of a hydraulic transmission through an electric servo device, comprising:

vehicle speed setting means for generating a voltage signal corresponding to a vehicle speed to be set;

compensating means interposed between said vehicle speed setting means and said electric servo device, said compensating means comprising a first delay element and a second delay element having a response characteristic slower than that of said first delay element; and selecting means for judging as to whether a voltage signal changed by the operation of said vehicle speed setting means represents an acceleration command or a deceleration command and for selecting said first delay element when said voltage signal represents an acceleration command and for selecting said second delay element when said voltage signal represents a deceleration command.

2. A vehicle speed control system for performing vehicle speed control by controlling the displacement of at least one of a hydraulic pump and a hydraulic motor of a hydraulic transmission through an electric servo device, comprising:

vehicle speed setting means for generating a voltage signal corresponding to a vehicle speed to be set;

means for generating a voltage signal corresponding to zero vehicle speed;

switching means interposed between said vehicle speed setting means and said electric servo device, said switching means having a first input terminal for receiving a voltage signal from said vehicle speed setting means and a second input terminal for receiving the voltage signal corresponding to the zero vehicle speed; and switching control means for controlling said switching means so as to output the signal inputted through said second input terminal when the voltage signal generated by said vehicle speed setting means falls within a predetermined voltage range corresponding to the zero vehicle speed or the vicinity of the zero vehicle speed, and to output the signal inputted through said first input terminal when the voltage signal generated by said vehicle speed setting means falls outside said predetermined voltage range.

3. The vehicle speed control system of claim 2 wherein the voltage signal generated from said vehicle speed setting means is supplied into said first input terminal by way of minimum speed setting means for forming the voltage signal generated from said vehicle speed setting means into a voltage signal corresponding to a minimum vehicle speed that an operator can perceive when the voltage signal generated from said vehicle speed setting means falls outside said predetermined voltage range.

4. A vehicle speed control system for performing speed control of a vehicle by controlling the displacement of at least one of a hydraulic pump and a hydraulic motor of a hydraulic transmission through an electric servo device, comprising:

vehicle speed setting means for generating a voltage signal corresponding to a vehicle speed to be set;

mechanical brake signal generating means for generating mechanical brake signal when said voltage signal corresponds to the zero vehicle speed or the vicinity of the zero vehicle speed; and a mechanical brake for braking said vehicle when receiving the mechanical brake signal from said mechanical brake signal generating means.

5. A vehicle speed control system for performing speed control of a vehicle by controlling the displacement of at least one of a hydraulic pump and a hydraulic motor of a hydraulic transmission through an electric servo device, comprising:

vehicle speed setting means for generating a voltage signal corresponding to a vehicle speed to be set;

first brake signal generating means for generating a voltage signal corresponding to the depressed amount of a brake pedal;

means for subtracting the voltage signal corresponding to the depressed amount of brake pedal from the voltage signal generated from said vehicle speed setting means and for supplying the subtracted voltage signal into said electric servo device;

second brake signal generating means for generating a mechanical brake signal when said subtracted voltage signal corresponds to the zero vehicle speed or the vicinity of the zero vehicle speed; and a mechanical brake for braking said vehicle when receiving the mechanical brake signal generated from said mechanical brake signal generating means.

6. The vehicle speed control system of claim 5 wherein said first brake signal generating means instantaneously generates a voltage signal for decreasing a voltage signal corresponding to the maximum set speed of said vehicle to a voltage signal corresponding to the zero vehicle speed when said brake pedal is depressed beyond a preset position for sudden braking.

7. The vehicle speed control system of claim 5 further comprising compensation means having first and second delay elements, for setting a delay of the voltage signal generated by the first and second signal generating means, respectively, said second delay element having a response characteristic faster than that of said first delay element, wherein said first brake signal generating means generates a voltage signal which increases to a voltage corresponding to the depressed amount of said brake pedal with a delay determined by said first delay element when said brake pedal is depressed up to a preset position for sudden stop braking, and generates a voltage signal which decreases with a delay determined by said second delay element when said brake pedal is released.

* * * * *